Nov. 22, 1966  J. MÜLLER  3,286,598

DUPLICATING MILLING MACHINE

Filed Oct. 19, 1964  2 Sheets-Sheet 1

INVENTOR
JOHANN MÜLLER
By Rupert J. Brady
ATTORNEY

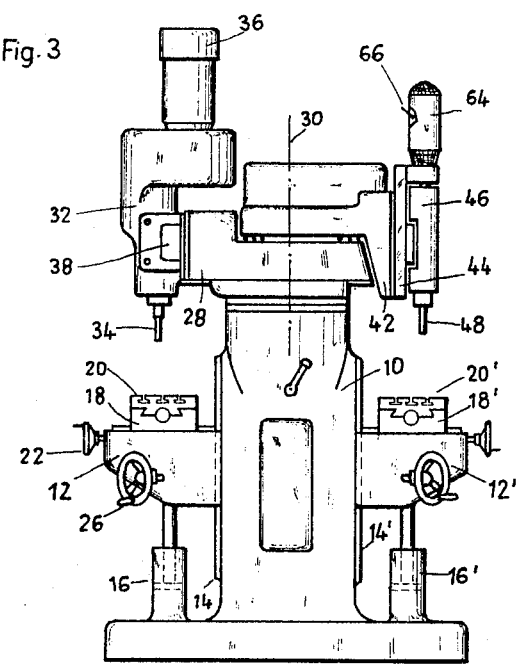

United States Patent Office 3,286,598
Patented Nov. 22, 1966

3,286,598
DUPLICATING MILLING MACHINE
Johann Müller, Munich, Germany, assignor to Hans Deckel, Munich, Germany, and Friedrich Wilhelm Deckel, Zug, Switzerland
Filed Oct. 19, 1964, Ser. No. 404,614
Claims priority, application Germany, Nov. 15, 1963, D 42,952
3 Claims. (Cl. 90—13.1)

This invention relates broadly to a duplicating milling machine having a workpiece and model table adapted for movement in three coordinate directions and more particularly to such a duplicating milling machine having a spindle turret, carrying machining tools at opposite ends, mounted on the upper side of the machine standard for pivotal movement about a vertical axis. By turning the spindle turret of such a machine, one or the other of the machining tools is brought into operating position over the workpiece and model table.

One of the objects of the invention is to provide a construction of duplicating milling machine in which a workpiece may easily be operated on by a roughing spindle and a precision duplicating tool without transferring the workpiece to a different table.

Another object of the invention is to provide a construction of duplicating milling machine having a turret for positioning a plurality of tools above the work table with the table adapted to move in three coordinate directions relative to a stationary roughing tool during roughing operation, and adapted to remain stationary during precision machining operations while the precision tool moves in three coordinate directions relative thereto.

A further object of the invention is to provide a construction of milling machine having a pair of tables and a pair of tools of different type pivotally mounted on the machine for selective positioning over either table.

Still a further object of the invention is to provide a construction of milling machine having a pair of tables on which two different machining operations can be simultaneously performed and on which operations can be easily switched.

Still another object of the invention resides in the manner in which the machining range of the precision duplicating tool is increased by its connection to the spindle turret.

Other and further objects of the invention are set forth more fully in the specification hereinafter following by reference to the accompanying drawings, in which:

FIG. 3 is a side elevational view showing a modified form of the machine of FIG. 1.

Figure 1:
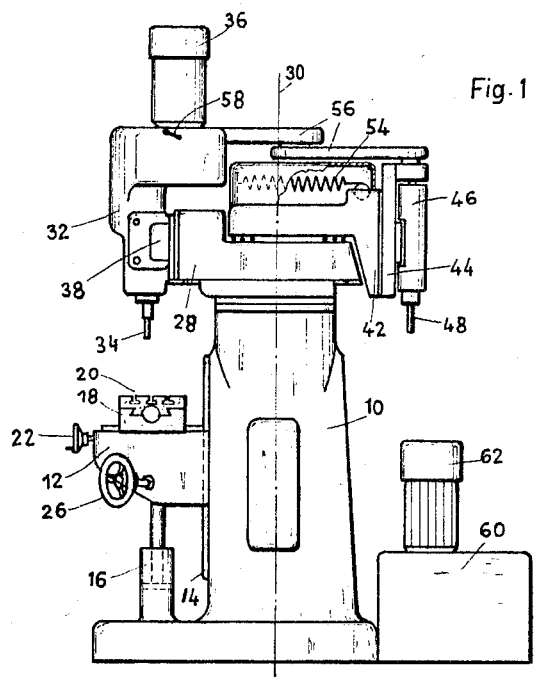
FIG. 1 is a side elevational view of the duplicating milling machine of the invention, with a portion shown in broken-away section.

Referring to the drawings in greater detail, a table bracket 12 is connected in vertical guide 14 for movement on machine standard 10 carrying the vertical guide. As indicated in FIG. 1 a hydraulic shifting device 16 is connected under the table bracket for imparting movement thereto. A cross support 18 is connected on table bracket 12 and table 20 is connected to cross support 18, in the usual manner, such that table 20 can be moved in longitudinal and transverse directions by manipulation of handwheels 22 and 24. Table bracket 12, in addition to being moved by hydraulic shifting device 16 may also be moved vertically relative to machine standard 10 by means of handwheel 26. In the same manner, additional hydraulic control means, not shown, are provided for hydraulically imparting horizontal movement to table 20, that is, for hydraulically moving the table in longitudinal and transverse directions.

Figure 2:
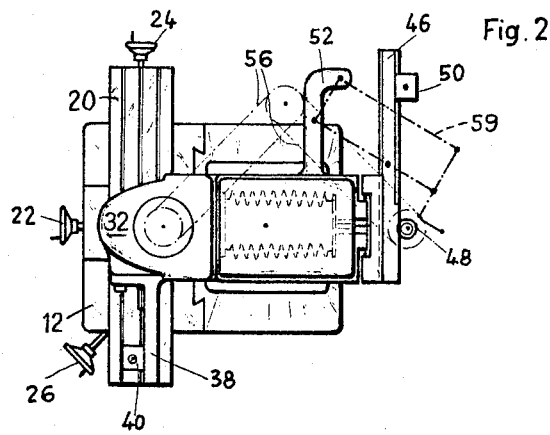
FIG. 2 is a top plan view of the duplicating milling machine of FIG. 1 with portions thereof shown schematically and in dot-dash lines for purposes of clarity.

A spindle turret 28 is pivotally connected to the upper side of machine standard 10 in such manner that it can pivot in a horizontal plane about the vertical axis 30 of the machine. A spindle head 32 carrying a machining tool 34 and a motor 36, connected to drive tool 34, is connected to one front end of spindle turret 28. A hydraulic feeler 40 is associated with machining tool 34, as shown in FIG. 2, by means of arm 38 connected to and movable with spindle head 32. Hydraulic feeler 40, not shown for purposes of clarity in FIG. 1, can be displaced along arm 38 and locked in selected position thereon to extend into contact with a model on table 20, while machining tool 34 extends into contact with a workpiece clamped on table 20. In a preferred embodiment of the invention one machining tool on the spindle turret 28, namely tool 34, is a roughing spindle and the hydraulic feeler 40 associated therewith controls the movement of table 20 in three coordinate directions during the roughing operation, by hydraulic shifting device 16 and the other mentioned hydraulic control means, not shown, connected to the hydraulic control plant 60 which is powered by motor 62. Thus hydraulic feeler 40 controls the outputs of the hydraulic control plant.

Another machining tool 48 comprising a precision duplicating tool manually guided by hand in three coordinate directions is carried on the opposite end of spindle turret 28 as explained more fully hereinafter following. In the machine of the invention the two machine tools 34 and 48, which normally must be used successively for duplicating operations on a workpiece, are so combined with each other that the entire duplicating operation, both roughing and precision machining, can be effected without transferring the workpiece to another table or clamping surface. In the roughing operation with roughing tool spindle 34 the table is moved hydraulically in three coordinate directions relative to the tool, while during the precision machining operation with precision-duplicating tool 48, the tool 48 is manually guided by hand in three coordinate directions while the table 20, workpiece and model (not shown) thereon remain stationary.

The precision-duplicating tool is supported in a guide on the upper side of spindle turret 28, which guide extends longitudinally of the turret. Support body portion 42 carrying the vertically displaceable carriage 44 on the outer end thereof, is connected in a ball bearing guide extending longitudinally on the top surface of turret 28 such that support body portion 42 is adapted for movement transverse of the machine standard. Horizontally extending beam 46, carrying precision machining tool 48, is connected for horizontal guided movement on carriage 44. A scanner 50 associated with tool 48 can be displaced along horizontal beam 46 and locked in selected position thereon for scanning a model on the table. A pantograph, shown schematically in dot-dash lines in FIG. 2 at 59, is supported on an arm 52 and connected to beam 46 for manual movement thereof by hand. The precision-duplicating tool 48 can be moved horizontally and vertically by the pantograph through the movement of beam 46 and carriage 44. The range of motion of tool 48 in the transverse direction is usually relatively small because the masses to be moved must be as small as possible in such an arrangement in order to increase the precision obtainable from the tool. However, according to an object of the invention, in the machine of the present invention the machining range of the tool 48 in the transverse direction is increased beyond the immediate range of the precision-duplicating tool, since the spindle turret 28 can be displaced transversely in the same direction as the transverse displacement between support body portion 42 and spindle turret 28.

The weight of the vertically movable carriage 44 and beam 46 is balanced by springs 54 or similar devices connected between the carriage and body portion 42. Precision machining tool 48 is driven by motor 36 over an angle belt drive 56 connected therebetween. By means of mechanism, not shown, within spindle head 32, the motor 36 may be switched by switch 58 to selectively drive roughing tool 34 or precision machining tool 48 over angle belt drive 56.

Another embodiment of the machine according to the invention is shown in FIG. 3. This embodiment differs from the previously described machine only in that a second table 20', for workpiece and model, is provided on the side of the machine standard 10 opposite the first table. Parts of the second table corresponding to similar parts of the first table are designated by corresponding primed reference numerals. The second table 20' is controllable in three coordinate directions, as the first table, either by manual means, or hydraulic means including 16' connected to hydraulic control plant 60. The control of the hydraulic feeler 40 of the roughing tool 34 can be selectively switched to either one of the two tables depending on which table is being used for roughing operations. In this machine, roughing and smoothing operations can be carried out simultaneously on the two different tables. While a workpiece is machined on one table such as table 20 by roughing tool 34, a workpiece on which roughing operations have already been completed is smoothed and precision machined by precision machining tool 48 on the opposite table 20'. When the smoothing operation is completed the finished workpiece is removed from table 20' and a new workpiece is chucked on the table. The spindle turret 28 is then pivoted or rotated 180 degrees about axis 30 to position the precision machining tool 48 over the roughened workpiece on table 20 and position roughing tool 34 over the new workpiece on table 20'. Roughing operations are then carried out on table 20' while smoothing operations are carried out on table 20.

As indicated in FIG. 3 a special motor 64 may be provided for the precision machining tool 48 on beam 46, with the motor being provided with a switch 66 to energize and deenergize the same. In this form of the invention the pivoted angle belt drive 56 is eliminated and motor 36 drives only the roughing tool 34.

While the invention has been described in certain preferred embodiments it is realized that modifications may be made without departing from the concept of the invention and it is to be understood that no limitations on the invention are intended other than may be imposed by the scope of the appended claims.

What I claim as new and desire to secure by Letters Patent of the United States, is as follows:

1. A duplicating milling machine comprising, a machine standard having an upper surface and a vertical axis, a table adapted for movement in three coordinate directions and adapted to hold a workpiece and model operatively connected to said machine standard, a turret portion connected to the upper surface of said machine standard for pivotal movement about the vertical axis thereof, first and second machine tool means connected at opposite ends of said turret portion in operative relation to said table, said first machine tool means including a roughing spindle, a hydraulic feeler connected adjacent said roughing spindle, hydraulic control means connected to said table and said hydraulic feeler whereby said hydraulic feeler is connected to selectively move said table through said hydraulic control means in three coordinate directions relative to said roughing spindle, said second machine tool means comprising a precision duplicating tool connected for movement in three coordinate directions relative to a fixed position of said table, guide means connected to said precision duplicating tool for moving said precision duplicating tool by hand and said turret portion being pivotal from a first position to a second position to successively dispose said first and second machine tool means in operative position above said table.

2. A duplicating milling machine as set forth in claim 1 including guide means connected on the upper surface of said turret portion and extending longitudinally thereof, and said second machine tool means connected in said guide means for movement relative to said first machine tool means and transverse of said machine standard and the vertical axis.

3. A duplicating milling machine as set forth in claim 1 including a second table operatively connected to said machine standard for movement in three coordinate directions opposite said first mentioned table, said tables respectively connected beneath said first and second machine tool means, said second table operatively connected to said hydraulic control means and said hydraulic feeler whereby said hydraulic feeler may be switched to hydraulically move a selected one of the two tables when the roughing spindle is positioned thereabove such as to provide simultaneous and successive operations of said first and second machine tools on workpieces on the tables.

References Cited by the Examiner

UNITED STATES PATENTS

| | | | |
|---|---|---|---|
| 988,231 | 3/1911 | Vernet | 90—13 |
| 2,572,756 | 10/1951 | Plimmer et al. | 90—13 |
| 3,165,974 | 1/1965 | Zwick | 90—13 |

WILLIAM W. DYER, Jr., *Primary Examiner.*

G. A. DOST, *Assistant Examiner.*